PHILIP W. VAUGHAN, OF COLUMBIA, KENTUCKY.

Letters Patent No. 87,605, dated March 9, 1869.

IMPROVED MEDICAL COMPOUND.

The Schedule referred to in these Letters Patent and making part of the same.

Be it known that I, PHILIP W. VAUGHAN, of the town of Columbia, in the county of Adair, and State of Kentucky, have discovered a new and useful Remedy and Cure for Neuralgia; and I do hereby declare that the following ingredients, and proportions of each, compose the remedy and cure:

One ounce sal-ammoniac.
One ounce camphor.
One ounce soda.
One-half ounce tincture of ginger.
Thirty grains quinine.
One-half ounce laudanum.

Put into one pint of pure corn whiskey or pure brandy.

When thoroughly dissolved, take one teaspoonful every hour until relieved.

What I claim as my invention, is—

A medicine for the cure of neuralgia.

P. W. VAUGHAN.

Witnesses:
S. K. RHOW,
G. S. FIELD.